Patented Mar. 25, 1952

2,590,831

UNITED STATES PATENT OFFICE 2,590,831

SYNTHESIS OF STREPTAMINE

Melville Lawrence Wolfrom, Columbus, Ohio, and Stephen Munro Olin, Elkhart, Ind., assignors to The Ohio State University Research Foundation, Columbus, Ohio, a corporation of Ohio No Drawing. Application April 19, 1949,
Serial No. 88,499

13 Claims. (Cl. 260—210)

This invention relates generally to the antibiotic streptomycin, and more particularly to a method for the production of 1,3-diamino-2,4,5,6-tetrahydroxy-cyclohexane, hereafter referred to as streptamine, and hexaacetyl streptamine, and valuable intermediate compounds in the production thereof.

The streptomycin molecule has been shown to consist of a disaccharide of N-methyl-L-glucosamine-L-streptose linked glycosidically with a diguanidine-inositol, designated streptidine, and is believed to have the following structural formula:

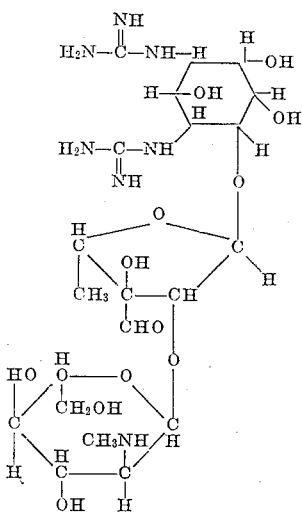

Thus it is seen that the molecule of the antibiotic streptomycin consists of three moieties, N-methyl-glucosamine, 3-C-formyl-5-desoxy-L-aldopentofuranoside and a meso-diguanidine-inositol.

Streptidine was first isolated by the acid hydrolysis of streptomycin hydrochloride as the crystalline sulfate and picrate. (Science, 103, 53 (1946)).

Strong alkaline hydrolysis of streptidine would yield four moles of ammonia and two moles of carbon dioxide with the production of a compound having the following formula:

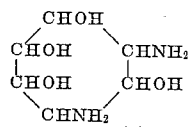

This compound 1,3-diamino-2,4,5,6-tetrahydroxy-cyclohexane will hereinafter be designated streptamine (J. Fried, G. A. Boyack and O. Wintersteiner, J. Biol. Chem., 162, 391 (1946)). Streptamine forms a hexaacetate which crystallizes in two forms: a chloroform-insoluble fraction crystallizing in long needles of M. P. 343–345° with a characteristic transition point at 250° to longer needles, and a chloroform-soluble fraction which possesses the same characteristic transition point and melting point as the chloroform-insoluble form. (R. L. Peck, C. E. Hoffman, Jr., Elizabeth W. Peel, R. P. Graber, F. W. Holly, R. Mozingo and K. Folkers, J. Am. Chem. Soc. 68, 776 (1946)).

The present invention involves a novel process for the preparation of streptamine comprising the following steps:

1. Reacting N-acetyl-D-glucosamine with ethyl mercaptan to yield crude N-acetyl-D-gluosamine diethyl thioacetyl. This may be purified by the preparation of pentacetyl D-glucosamine diethyl thioacetal, chromotographic separation, and subsequent de-O-acetylation to yield a pure N-acetyl-D-glucosamine diethyl thioacetal.

2. Reacting N-acetyl-D-glucosamine diethyl thioacetal with mercuric chloride and mercuric oxide, to yield ethyl 2-desoxy-2-acetamido-α-D-glucothiofuranoside.

3. Reacting ethyl-2-desoxy-2-acetamide-α-D-glucothiofuranoside with lead tetraacetate, and treatment of the resulting product with nitromethane, neutralizing and crystallizing the product, a mixture of ethyl 2,6-didesoxy-2-acetamido-6-nitro-α-D-glucothiofuranoside and ethyl 2,6-didesoxy-2-acetamido-6- nitro - β - L - idothiofuranoside. These products are then separated and the higher melting form is demercaptolated and condensed intramolecularly, acidified, hydrogenated, then acetylated to streptamine hexaacetate.

4. Streptamine hexaacetate is converted to streptamine by hydrolysis.

The following equations will serve to graphically illustrate the above process:

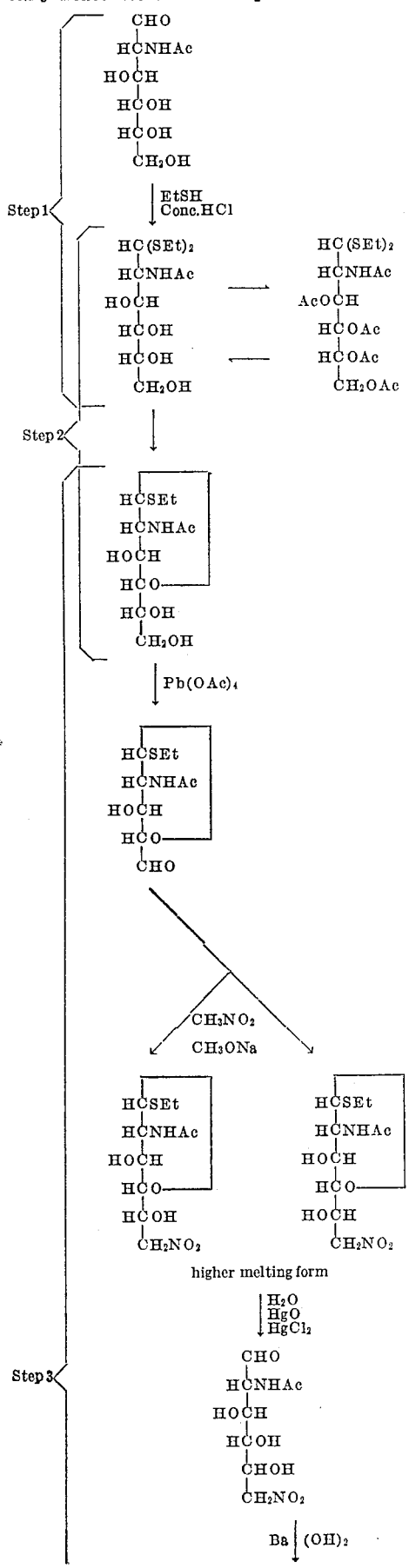

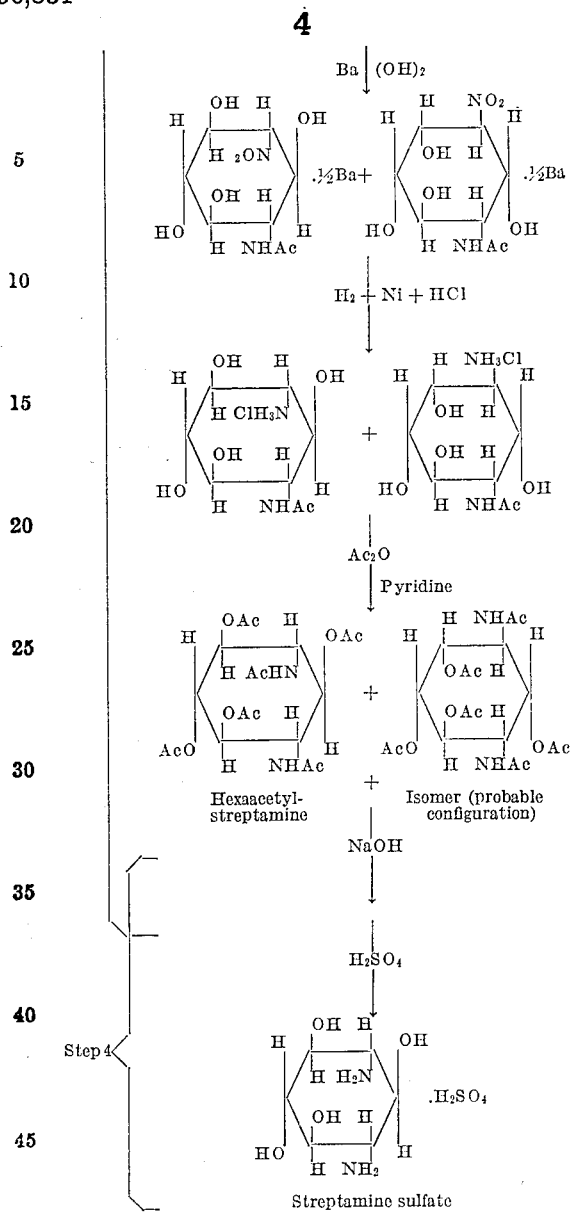

The following examples will serve to more fully illustrate the present invention; all parts being by weight and all temperatures being by centigrade unless otherwise indicated.

EXAMPLE 1

*The preparation of pentaacetyl D-glucosamine diethyl thioacetal*

N-acetyl-D-glucosamine (29 g.) was dissolved in concentrated hydrochloric acid (120 cc.) at 0° and ethyl mercaptan (120 cc.) was added. The reaction mixture was stirred vigorously at 0° for twenty hours and then neutralized in the cold with concentrated ammonium hydroxide. The diethyl mercaptan layer was drawn off and discarded and the aqueous solution concentrated at reduced pressure. The resulting solids were dried by dissolving in absolute ethanol and concentrating at reduced pressure. An acetic anhydride-pyridine mixture (150 cc. of two parts acetic anhydride, one part pyridine) was added to the dried solid and allowed to stand at room temperature for eighteen hours. The acetylation mixture was poured onto ice water (700 cc.) and extracted with four portions of chloroform (75 cc.). The chloroform solution was washed with water, saturated aqueous sodium bicarbonate and finally with water. The dried chloroform solution was concentrated to a thick syrup at reduced pressure. Seed crystals were obtained by elution of the lowest zone of a chromatographic column, M. P. 123–126°, spec. rot. −26.0° (c 5, chloroform, D-line, 20° C.). Recrystallization from methanol and water yielded a compound of M. P. 126–127°, spec. rot. −32° (c 4, chloroform, D-line, 22°). Further recrystallizations did not alter these constants.

*Analysis.*—Calculated for $C_{22}H_{33}O_9NS_2$:

| Calculated | Found |
|---|---|
| C, 48.47 | C, 47.95   47.87 |
| H, 6.71 | H, 6.83   6.75 |
| S, 12.93 | S, 12.50 |
| N, 6.76 | N, 3.01   2.98 |

The yield of the acetylated mercaptal was 40% of the theoretical and numerous efforts to increase the yield were fruitless. However, this was due to the poor crystallizing properties of the acetylated compound. By deacetylation of the sirup, yields up to 80% of the theoretical were obtained. Reacetylation of the diethyl thioacetal yielded a compound with the same constants as above and analyses of the same order of accuracy.

EXAMPLE 2

*The preparation of N-acetyl-D-glucosamine diethyl thioacetal (2-desoxy-2-acetamido-D-glucose diethyl thioacetal)*

Pentaacetyl-D-glucosamine diethyl thioacetal (2.8 g.) was dissolved in absolute methanol (75 cc.) and cooled to 0°. Anhydrous ammonia was passed into the solution for fifteen minutes at a rate which maintained the temperature between 0–5°. The deacetylation mixture was allowed to stand for two hours at room temperature and then concentrated to 20° C. and an equal volume of chloroform was added. The solution was treated with activated charcoal and filtered. Anhydrous ether was added to the filtrate until the solution became cloudy. After standing overnight in the icebox, 1.5 g. of crystalline material was removed by filtration; M. P. 127–129°, spec. rot. −23.4° (c 4, methanol, D-line, 23°). After two recrystallizations the constants were as follows: M. P. 130–131°, spec. rot. −35.0° (c 4, methanol, D-line, 23°). Further recrystallizations did not alter these constants.

*Analysis.*—Calculated for $C_{12}H_{25}O_5S_2N$:

| Calculated | Found |
|---|---|
| C, 44.02 | C, 43.83   44.03 |
| H, 7.70 | H, 7.97   7.60 |
| S, 19.58 | S, 19.89   19.92 |
| N, 4.28 | N, 4.26   4.19 |

EXAMPLE 3

*The preparation of ethyl 2-desoxy-2-acetamido-α-D-glucothiofuranoside*

Yellow mercuric oxide was prepared from mercuric chloride (5 g.) and sodium hydroxide (2 g.) according to the method of Green and Pascu. N-acetyl-D-glucosamine diethyl thioacetal (4.65 g. in 60 cc. of water) and the washed oxide suspension were combined. Mercuric chloride (2.01 g.) dissolved in water (150 cc.) was added dropwise over a period of twenty minutes under vigorous mechanical stirring. At the end of the addition the reaction mixture was stirred for fifteen minutes. Pyridine (3 cc.) was added and the solution was filtered through a precoat of Celite. The filtrate was concentrated at reduced pressure and the resulting sirup was crystallized from ethanol, ether and one drop of pyridine, yield 2.01 g.; M. P. 116–118°, spec. rot. +153.0° (c 3, water, D-line, 23°). Three recrystallizations from the same solvents yielded 1.06 g. (30% of the theoretical); M. P. 119–121°, spec. rot. +170° (c 3, water, D-line, 22°).

*Analysis.*—Calculated for $C_{10}H_{19}O_5NS$:

| Calculated | Found |
|---|---|
| C, 45.27 | C, 45.44   45.43 |
| H, 7.22 | H, 7.17   6.93 |
| N, 5.28 | N, 5.11   5.01 |
| S, 12.07 | S, 11.80   11.87 |

EXAMPLE 4

*The preparation of ethyl 2-desoxy-2-amino-tetraacetyl-α-D-glucothiofuranoside*

N-acetyl-D-glucosamine diethyl thioacetal (10.0 g.) was treated as previously in the above thiofuranoside preparation. The resulting sirup was acetylated by dissolving in pyridine (60 cc.) and then adding acetic anhydride (60 cc.). The acetylation mixture was allowed to stand at room temperature for eighteen hours and then poured into ice water. The aqueous solution was extracted with four portions of chloroform (75 cc.). The extract was washed with water, saturated aqueous sodium bicarbonate solution and finally with water. The dried chloroform solution was concentrated to a thin sirup and taken up in absolute ethanol. The solvents were removed at reduced pressure whereupon the concentrate crystallized; M. P. 80–90°. Recrystallization from aqueous ethanol yielded a compound (2.51 g.) of M. P. 119–122°, spec. rot. +123° (c 4, chloroform, D-line, 23°). Two subsequent recrystallizations yielded a product of M. P. 124.5–125.5°, spec. rot. +140° (c 4, chloroform, D-line, 23°). Further recrystallizations did not alter these constants.

*Analysis.*—Calculated for $C_{16}H_{25}O_8NS$:

| Calculated | Found |
|---|---|
| C, 49.47 | C, 49.22 |
| H, 6.49 | H, 6.72 |
| N, 3.61 | N, 3.77 |
| S, 8.25 | S, 8.03 |

Deacetylation of ethyl 2-desoxy-2-amino-tetraacetyl-α-D-glucothiofuranoside (88 mg.) yielded a compound (25 mg., 45% of the theoretical) which was identical with ethyl 2-desoxy-2-acetamide-α-D-glucothiofuranoside of M. P. 119–121°, spec. rot. +170° (c 4, water, D-line, 22°), as determined by physical constants and mixed melting point.

EXAMPLE 5

*The preparation of ethyl 2-desoxy-2-amino-tetraacetyl-β-D-glucothiofuranoside*

The mother liquors from the crystallization of ethyl 2-desoxy-2-amino-tetraacetyl-α-D-glucothiofuranoside were concentrated to a sirup and chromatographed on Magnesol. Elution of the lower zone with acetone yielded a compound of M. P. 179–180°, spec. rot. —42.4° (c 2, chloroform, D-line, 22°). Further recrystallizations from ethanol water did not alter these constants.

*Analysis.*—Calculated for $C_{16}H_{25}O_8NS$:

| Calculated | Found |
| --- | --- |
| C, 49.47 | C, 49.21 |
| H, 6.49 | H, 6.59 |
| N, 3.61 | N, 3.46 |
| S, 8.25 | S, 8.10 |

EXAMPLE 6

*The preparation of ethyl 2,6 - didesoxy - 2 - acetamido-6-nitro - α - D - glucothiofuranoside and ethyl 2,6-didesoxy - 2 - acetamido-6-nitro-β-L-idothiofuranoside*

Ethyl 2,desoxy - 2 - acetamido-α-D-glucothiofuranoside (2.51 g.) was dissolved in absolute methanol (100 cc.). The solvent was removed at reduced pressure and the resulting sirup was dissolved in methanol (3 cc.) and chloroform (50 cc.). Lead tetraacetate (4.43 g.) in chloroform (100 cc.) was added and the reaction mixture warmed to 50–55°. After fifteen minutes the slight remaining color was removed by the addition of ethylene glycol (one drop). The chloroform solution was cooled in an ice bath and the lead diacetate was removed by filtration. The chloroform solution was extracted six times with cold water in 2 cc. portions. The water extracts were extracted with chloroform. The chloroform solutions were dried and concentrated at reduced pressure. The resulting sirup was taken up in 20 cc. of 95% ethanol and nitromethane (10 cc.). The solution was made basic to litmus with 2 N sodium methylate (5 cc.) and the reaction mixture was allowed to stand in the ice box for eighteen hours. The solution was concentrated at reduced pressure to a thin sirup and chloroform (150 cc.) was added. The solution was concentrated under reduced pressure to 100 cc. and extracted with cold water. The dried chloroform solution was concentrated under reduced pressure to a yellow crystalline residue (0.45 g.). The isomers were separated coarsely by fractional crystallization from methanol, chloroform and n-butyl ether; however, the method was wasteful. An efficient separation was made by chromatographing the mixture on Magnesol which had been washed with 6 N hydrochloric acid. The top zone yielded a compound of M. P. 112.5–113°, spec. rot. (c 2, methanol, D-line, 25°).

*Analysis.*—Calculated for $C_{10}H_{18}O_6N_2S$:

| Calculated | Found |
| --- | --- |
| C, 40.80 | C, 40.48 |
| H, 6.16 | H, 6.26 |
| N, 9.52 | N, 9.23 |

The lower zone yielded a compound of M. P. 190–193° (with decomposition).

*Analysis.*—Calculated for $C_{10}H_{18}O_6N_2S$:

| Calculated | Found | |
| --- | --- | --- |
| C, 40.80 | C, 40.64 | 40.58 |
| H, 6.16 | H, 5.78 | 5.99 |
| N, 9.52 | N, 9.48 | 9.45 |

EXAMPLE 7

*The preparation of streptamine hexaacetate*

The high melting form M. P. 190–193° (with decomposition) from the preparation of the ethyl 2,6-didesoxy-2-acetamide-6-nitro-α-hexothiofuranoside was used in the initial preparation of streptamine hexaacetate. One hundred sixty-five miligrams of this compound was dissolved in warm water (40 cc.) and mercuric chloride (150 mg.) in water (10 cc.) was added. The reaction mixture was allowed to stand at room temperature for two hours. The mercury mercapto chloride was removed by filtration. Silver acetate (20 mg.) was added to the filtrate and the reaction mixture was kept at room temperature overnight. After the silver chloride and excess silver acetate were removed by filtration, hydrogen sulfide was passed into the filtrate. The sulfides were removed by filtration and the filtrate blown to a clear sirup. All efforts to obtain a crystalline material from this sirup failed. Eighty milligrams of the above sirup was dissolved in water (1 cc.) and 1.60 cc. of barium hydroxide (0.1944 N) was added. On standing twenty-four hours at room temperature the solution turned straw colored. Absolute ethanol (10 cc.) was added and a highly colored flocculent precipitate was removed by filtration. The solvent was removed in a stream of air and efforts to obtain a crystalline barium salt failed. Fifty milligrams of the barium salt was dissolved in 0.1 N hydrochloric acid (4 cc.) and combined with Raney nickel catalyst (200 mg.) in water (30 cc.). The solution was hydrogenated at room temperature under one atmosphere pressure. The catalyst was removed at the centrifuge and washed with ethanol. The supernatant liquid and washings were blown to dryness and acetylated in acetic anhydride-pyridine mixture (3 cc. of 2:1) under gentle reflux for one hour. The reaction mixture was blown to dryness and extracted with warm chloroform. The residue from the chloroform extraction was treated with warm absolute ethanol. The absolute ethanol solution was filtered and placed in the ice box: after twelve hours 4 mg. of needle clusters had formed. The needles were removed by filtration and X-ray diffraction pattern was taken of this material. This compound was shown to be identical with streptamine hexaacetate on the basis of this evidence. The compound also possessed a similar transition point and melting points as streptamine hexaacetate prepared from the degradation product of streptomycin; transition point 245–250°, M. P. 345–348° (in sealed capillary). The chloroform solution was blown to dryness and elongated prisms formed which were insoluble in cold chloroform. The compound was removed from the chloroform solution by filtration, yield 5 mg. of M. P. 350–355° with decomposition. A powder X-ray diffraction pattern was taken of this material. It was shown on this evidence to be neither the chloroform soluble or chloroform insoluble crystalline form of streptamine hexaacetate.

*X-ray diffraction patterns*

| Streptamine Hexaacetate from Streptomycin | | Streptamine Hexaacetate from D-Glucosamine | |
|---|---|---|---|
| Interplanar Spacing, Å. | Relative Intensity | Interplanar Spacing, Å. | Relative Intensity |
| 7.09 | 0.7 | 7.05 | 0.6 |
| 4.55 | 1.0 | 4.54 | 1.0 |
| 3.94 | 0.7 | 3.94 | 0.8 |
| 3.54 | 0.4 | 3.54 | 0.5 |
| 3.28 | 0.5 | 3.28 | 0.5 |
| 3.09 | 0.2 | 3.09 | 0.2 |
| 2.87 | 0.1 | 2.87 | 0.1 |
| 2.57 | 0.2 | 2.57 | 0.2 |
| 2.38 | 0.2 | 2.38 | 0.1 |
| 1.88 | 0.2 | 1.88 | 0.2 |
| 1.77 | 0.05 | 1.77 | 0.05 |

EXAMPLE 8

1 gram of streptamine hexaacetate is refluxed with 100 ml. of 6 N sodium hydroxide for 48 hours. After neutralization streptamine is isolated as the slightly soluble sulfate salt.

It is to be understood that the above particular description is by way of illustration, and that changes, omissions, additions, substitutions and/or modifications may be made within the scope of the claims without departing from the spirit of the invention which is intended to be limited only as required by prior art.

We claim:

1. Process of preparing streptamine which comprises reacting N-acetyl-D-glucosamine with ethyl mercaptan to obtain N-acetyl-D-glucosamine diethyl thioacetal, reacting the N-acetyl-D-glucosamine diethyl thioacetal with mercuric chloride and mercuric oxide to obtain ethyl 2-desoxy-2-acetamido-α-D-glucothiofuranoside, reacting the ethyl 2-desoxy-2-acetamido-α-D-glucothiofuranoside with lead tetraacetate, treating the resulting product with nitromethane and crystallizing a mixture of ethyl 2,6-didesoxy-2-acetamido-6-nitro-α-D-glucothiofuranoside and ethyl 2,6-didesoxy-2-acetamido-6-nitro-β-L- idothiofuranoside, separating, and demercaptolating the higher melting form, intramolecularly condensing, hydrogenating and acetylating to streptamine hexaacetate, which is subsequently hydrolyzed to streptamine.

2. Process which comprises reacting N-acetyl-D-glucosamine with ethyl mercaptan to obtain N - acetyl - D - glucosamine diethyl thioacetal, reacting the N - acetyl - D - glucosamine diethyl thioacetal with mercuric chloride and mercuric oxide to obtain ethyl 2-desoxy-2-acetamido-α-D-glucothiofuranoside, reacting the ethyl 2-desoxy - 2 - acetamido-α-D-glucothiofuranoside with lead tetraacetate, treating the resulting product with nitromethane and crystallizing a mixture of ethyl 2,6-didesoxy-2-acetamido-6-nitro-α-D-glucothiofuranoside and ethyl 2,6-didesoxy-2-acetamido-6-nitro-β-L-idothiofuranoside, separating, and demercaptolating the higher melting form, intramolecularly condensing, hydrogenating and acetylating to streptamine hexaacetate.

3. Process which comprises reacting N-acetyl-D-glucosamine with ethyl mercaptan to obtain N-acetyl-D-glucosamine diethyl thioacetal, reacting the N-acetyl-D-glucosamine diethyl thioacetal with mercuric chloride and mercuric oxide to obtain ethyl 2-desoxy-2-acetamido-α-D-glucothiofuranoside, reacting the ethyl 2-desoxy-2-acetamido-α-D-glucothiofuranoside with lead tetraacetate, treating the resulting product with nitromethane and crystallizing a mixture of ethyl 2,6-didesoxy-2-acetamido-6-nitro-α-D-glucothiofuranoside and ethyl 2,6-didesoxy-2-acetamido-6-nitro-β-L-idothiofuranoside.

4. Process which comprises reacting N-acetyl-D-glucosamine with ethyl mercaptan to obtain N-acetyl-D-glucosamine diethyl thioacetal, reacting the N-acetyl-D-glucosamine diethyl thioacetal with mercuric chloride and mercuric oxide to obtain ethyl 2-desoxy-2-acetamido-α-D-glucothiofuranoside.

5. Process which comprises reacting N-acetyl-D-glucosamine with ethyl mercaptan to obtain N-acetyl-D-glucosamine diethyl thioacetal.

6. The process of reacting N-acetyl-D-glucosamine diethyl thioacetal with mercuric chloride and mercuric oxide to obtain ethyl 2-desoxy-2-acetamido-α-D-glucothiofuranoside.

7. The process of reacting ethyl 2-desoxy-2-acetamido-α-D-glucothiofuranoside with lead tetraacetate, treating the resulting product with nitromethane and crystallizing a mixture of ethyl 2,6-didesoxy-2-acetamido-6-nitro-α-D-glucothiofuranoside and ethyl 2,6-didesoxy-2-acetamido-6-nitro-β-L-idothiofuranoside.

8. N-acetyl-D-glucosamine diethyl thioacetal.

9. Ethyl 2-desoxy-2-acetamido-α-D-glucothiofuranoside.

10. Ethyl 2,6-didesoxy-2-acetamido-6-nitro-α-D-glucothiofuranoside.

11. Ethyl 2,6-didesoxy-2-acetamido-6-nitro-β-L-idothiofuranoside.

12. Pentaacetyl D-glucosamine diethyl thioacetal.

13. A compound of the class consisting of N-acetyl-D-glucosamine diethyl thioacetal, ethyl 2-desoxy-2-acetamido-α-D-glucothiofuranoside, ethyl 2,6-didesoxy-2-acetamido-6-nitro-α-D glucothiofuranoside, ethyl 2,6-didesoxy-2-acetamido-6-nitro-β-L-idothiofuranoside and pentaacetyl D-glucosamine diethyl thioacetal.

MELVILLE LAWRENCE WOLFROM.
STEPHEN MUNRO OLIN.

REFERENCES CITED

The following references are of record in the file of this patent:

Peck: Jour. Am. Chem. Soc., 68, 779 (1946).
Carter: Science, 103, 53–54 (1946).